(12) United States Patent
Fram

(10) Patent No.: US 9,081,479 B1
(45) Date of Patent: Jul. 14, 2015

(54) USER INTERFACE SYSTEMS AND METHODS

(71) Applicant: DR Systems, Inc., San Diego, CA (US)

(72) Inventor: Evan K. Fram, Paradise Valley, AZ (US)

(73) Assignee: D.R. Systems, Inc., San Diego, CA (US)

( * ) Notice: Subject to any disclaimer, the term of this patent is extended or adjusted under 35 U.S.C. 154(b) by 214 days.

(21) Appl. No.: 13/651,328

(22) Filed: Oct. 12, 2012

Related U.S. Application Data

(63) Continuation of application No. 12/577,949, filed on Oct. 13, 2009, now abandoned.

(60) Provisional application No. 61/107,621, filed on Oct. 22, 2008.

(51) Int. Cl.
*G06F 3/048* (2013.01)
*G06F 3/0481* (2013.01)
*G06F 3/16* (2006.01)

(52) U.S. Cl.
CPC ............ *G06F 3/04817* (2013.01); *G06F 3/167* (2013.01)

(58) Field of Classification Search
USPC .......... 715/810, 812, 822, 823, 856, 860, 861
See application file for complete search history.

(56) References Cited

U.S. PATENT DOCUMENTS

| | | | |
|---|---|---|---|
| 5,596,699 A | 1/1997 | Driskell | |
| 5,701,424 A | 12/1997 | Atkinson | |
| 5,943,039 A | 8/1999 | Anderson et al. | |
| 6,549,219 B2 | 4/2003 | Selker | |
| 7,389,591 B2 * | 6/2008 | Jaiswal et al. | 33/366.11 |
| 8,423,306 B2 * | 4/2013 | Duncan et al. | 702/63 |
| 8,549,442 B2 * | 10/2013 | Marks et al. | 715/863 |
| 2002/0075333 A1 * | 6/2002 | Dutta et al. | 345/862 |
| 2004/0263475 A1 | 12/2004 | Wecker et al. | |
| 2005/0251755 A1 * | 11/2005 | Mullins et al. | 715/779 |
| 2006/0187204 A1 * | 8/2006 | Yi et al. | 345/158 |
| 2007/0136690 A1 | 6/2007 | Maclaurin et al. | |
| 2007/0234224 A1 * | 10/2007 | Leavitt et al. | 715/762 |
| 2007/0250793 A1 | 10/2007 | Miura et al. | |
| 2008/0046931 A1 | 2/2008 | Corbett et al. | |
| 2008/0222439 A1 * | 9/2008 | Lin et al. | 713/340 |

(Continued)

OTHER PUBLICATIONS

Bronevetsky, Greg, Circle Menus, "What is a Circle Menu?," downloaded from http://www.cs.cornell.edu/boom/2001sp/bronevetsky/What%20is%20a%20Circle%20Menu.htm on May 24, 2010 (3 pages).

(Continued)

*Primary Examiner* — Rashawn Tillery
(74) *Attorney, Agent, or Firm* — Knobbe, Martens, Olson & Bear LLP

(57) ABSTRACT

Systems and methods for providing user interfaces are disclosed. In certain embodiments, a menu having a number of icons can be provided on a display device such that the icons are arranged around an initial cursor position, or an area that is touched by a user's finger or stylus, for example. Due to the icons being arranged around the initial cursor position, any one of the icons from the menu can be chosen with relatively small cursor movement. In certain embodiments, the menu can be divided into regions that overlap with the icons, such that cursor movement from the initial cursor position into a given region has a similar effect as movement into the corresponding icon itself (without actually moving the cursor onto the desired icon).

19 Claims, 14 Drawing Sheets

(56) References Cited

U.S. PATENT DOCUMENTS

2009/0187860 A1 7/2009 Fleck et al.
2009/0235201 A1 9/2009 Baalbergen et al.
2009/0327964 A1 12/2009 Mouilleseaux et al.

OTHER PUBLICATIONS

Callahan, Jack et al., "An Empirical Comparison of Pie vs. Linear Menus," Computer ScienceDepartment, University of Maryland, Sep. 1988 (6 pages).
Hopkins, Don, "Dynamic Pie Menus," Don Hopkins' Web Site, submitted Sep. 18, 2005, downloaded from www.donhopkins.com/drupal/node/68, (3 pages).
Hopkins, Don, "Pie Menus for OLPC Sugar User Interface, in Python with GTK, Cairo and Pangomodules," Don Hopkins' Web Site, downloaded from www.donhopkins.com/drupal/node/128 on May 24, 2010 (13 pages).
Hopkins, Don, The Design and Implementation of Pie Menus—Dr. Dobb's Journal, Dec. 1991, Don Hopkins' Web Site, submitted Sep. 27, 2005, downloaded fromwww.donhopkins.com/drupal/node/98, (8 pages).
Hopkins, Don, "Theta Menus Proposal and Pie Menu Designs—May 1986," Don Hopkins' Web Site, submitted Sep. 26, 2005, downloaded from www.donhopkins.com/drupal/node/82, (14 pages).
Kurtenbach, G., et al., "User Learning and Performance with Marking Menus," Department of ComputerScience, University of Toronto, Ontario, Canada, as downloaded frombillbuxton.com/MMUserLearn.html on May 24, 2010 (11 pages).
Kurtenbach, Gordon, "Notes on the History of Radial menus, Pie menus and Marking menus," Alias, Toronto, Ontario, Canada, Apr. 2004 (2 pages).
Pie Menus, as downloaded from http://c2.com/cgi/wiki?PieMenus on May 24, 2010, (5 pages).
Rollo, Carl C., "A Brief Description of Pie Menus for Windows," as downloaded fromhttp://web.archive.org/web/20060505030416/www.sm.luth.se/~david/carl/www/piedscrp.html on May 24, 2010 (2 pages).
U. S. Office Action, Final, re U.S. Appl. No. 12/577,949, dated Apr. 13, 2012.
U. S. Office Action, Notice of Abandonment, re U.S. Appl. No. 12/577,949, dated Nov. 15, 2012.
U. S. Office Action, re U.S. Appl. No. 12/577,949, dated Dec. 16, 2011.

* cited by examiner

USER INTERFACE SYSTEMS AND METHODS

CROSS-REFERENCE TO RELATED APPLICATIONS

This application is a continuation of U.S. patent application Ser. No. 12/577,949 filed on Oct. 13, 2009, entitled "USER INTERFACE SYSTEMS AND METHODS," which claims priority under 35 U.S.C. §119(e) to U.S. Provisional Application Ser. No. 61/107,621, filed on Oct. 22, 2008, which is hereby expressly incorporated by reference in its entirety. All publications and patent applications mentioned in this specification are herein incorporated by reference in their entirety to the same extent as if each individual publication or patent application was specifically and individually indicated to be incorporated by reference.

BACKGROUND

1. Field

This invention relates to computing devices and, more particularly, to systems and methods of providing user interface for computing devices.

2. Description of the Related Art

In many computer uses, a user selects from a menu displayed on an interface such as a screen. Such selection can be achieved by, for example, a cursor based input. An interface device such as a mouse can move the cursor to a desired location for activating an icon of the menu.

In many situations, such cursor movement can cover significant distances on the screen. Repetition of cursor movements can result in user fatigue, frustration, and repetitive motion injury. Additionally, while each individual movement to a menu of a software application may require little time, repeated use of the menu over time results in a significant amount of cumulative time spent, reducing user productivity and efficiency.

SUMMARY

In one embodiment, a method for providing a user interface on a computing device comprises displaying a first menu on a display of a computing device, the first menu having a first plurality of icons arranged in an icon region that extends substantially around an initial position of a cursor, wherein the icon region defines a central region within the icon region that includes the initial cursor position. In one embodiment, the method further comprises detecting movement of the cursor to a second position within the central region, wherein the second position of the cursor is near a first icon of the first plurality of icons or includes at least a portion of the first icon, changing an appearance of the first icon in response to detecting movement of the cursor to the second position, wherein the change in appearance indicates that the icon is temporarily selected, initiating a first action associated with the first icon in response to detecting an input from the user indicating that the first icon should be permanently selected, wherein at least some of the method is performed by the computing device.

In one embodiment, a method for providing a user interface on a computing device comprises displaying a first menu on a display of the computing device, the first menu having a plurality of icons arranged substantially around a current position of a cursor, the plurality of icons defining a central region of the display between the plurality of icons and including the current position of the cursor, receiving a first input indicative of movement of the cursor, determining which of the plurality of icons is to be temporarily selected based at least in part on a pattern of the first input within the central region, and temporarily selecting the determined icon.

In one embodiment, a computing system comprises a display screen, an input device configured to facilitate interaction with a user, and a processor configured to execute software code that causes the computing system to display a menu on the display screen, the menu having a plurality of icons arranged about a home region, detect an input facilitated by the input device and indicative of the user's desire to at least temporarily select one of the icons, and determine which of the icons is to be at least temporarily selected based at least in part on a pattern of the input, the pattern involving at least a part of the home region.

In one embodiment, a method for providing a user interface on a computing device comprises displaying a first menu on a display of a computing device, the first menu having a first plurality of icons arranged in an icon region that extends substantially around an interaction position, wherein the interaction position comprises an area of the display where a user or an apparatus controlled by a user touched the display, a current position of a cursor, or a predetermined position on the display. In one embodiment, the method further comprising receiving a first user-initiated input indicative of movement from the interaction position, and in response to the movement, selecting an icon associated with a direction of the first user-initiated input, wherein at least some of the method is performed by the computing device.

DETAILED DESCRIPTION OF CERTAIN EMBODIMENTS

Figure 1A:
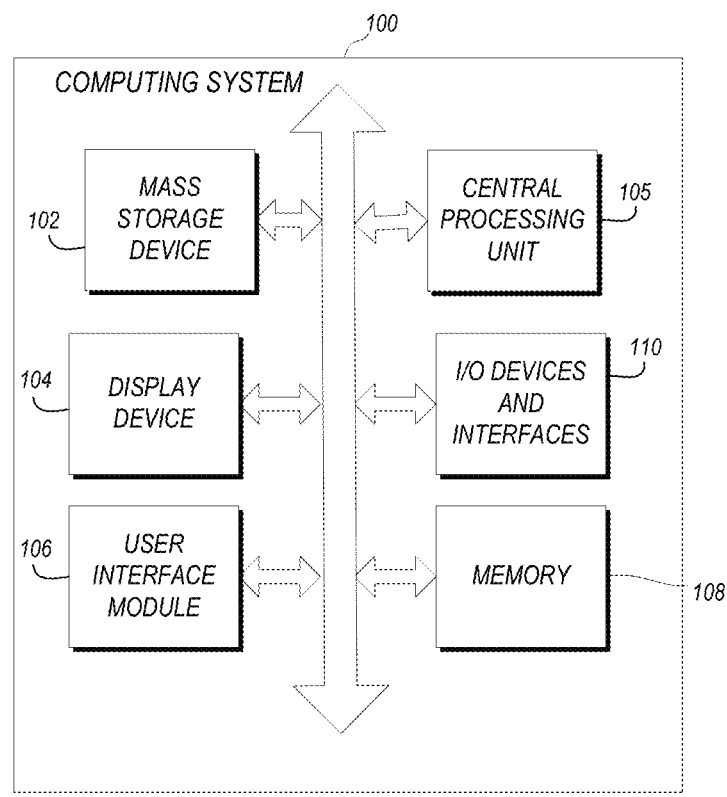
FIG. 1a is a block diagram illustrating one embodiment of a computing system that may be used to implement certain systems and methods described herein.

Embodiments of the user interface will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the user interface may include several novel features, no single one of which is solely responsible for its desirable attributes or which is essential to practicing the inventions herein described.

People spend large amounts of time interacting with computers and computer like devices such as cell phones, PDAs, gaming devices and portable media players. There is a need for improved ways of interacting with these and other devices that: improves speed and efficiency; reduces repetitive motion injury; is more intuitive; and/or operates well on small display screens.

Various systems and methods described herein address some or all of these issues with embodiments of a flexible graphical menu and an efficient method of interacting with it. While embodiments of the user interface will be illustrated using display of a graphical menu, sound could be used as a supplement or replacement for display of the graphical menu, as will be discussed below.

User Interfaces and Menus

User interfaces are described herein for depicting data on a display device of a computer, where the term "computer" is meant to include any of the computing devices described above, as well as any other electronic device that includes a display and/or other audio output device. Depending on the embodiment, the user interfaces described herein may provide one or more of several advantages. For example, a user interface may include a graphical menu that appears on demand so it does not take up room on the display screen until it is needed. This reduces screen clutter and is especially useful with small screens as there is no need to devote screen pixels to display the menu until it is needed. In another example, the user does not have to move the screen cursor large distances to initiate display of the graphical menu.

In yet another example, the graphical menu appears in a home region, which includes an area surrounding a current cursor position in one embodiment, or other area with which the user is likely interfacing with. Therefore, the user does not need to direct his attention to other areas of the screen, which may provide a particular advantage when users are concentrating on analyzing content of screen. In yet another example, the user can pick an icon (e.g., that is representative of a function that may be performed by a software application) within a graphical menu with only minimal mouse movement. In some embodiments, it is not necessary for the user to position the cursor over an icon or click on it, but only move slightly toward it. This may increase user speed and efficiency. In addition, the reduction in mouse movement has the potential to reduce repetitive motion injury, particularly in applications where users interface with computers for many hours per days, for example: radiologists reading medical imaging exams on Picture Archive and Communication Systems; office workers who spend hours per day with email, word processing, and spreadsheet applications, for example; web surfing; and/or computer gaming.

In another example, the systems and methods described herein may provide visual and/or auditory feedback as to which of the items in a graphical menu has been chosen and the user can vary mouse position and dynamically change the selected icon. In yet another example, once a user learns the relative positions of icons within a graphical menu, there is no need for the user to visually examine the presented menu; rather, the user may rapidly choose the desired icon by moving the mouse (or other input device) in the remembered direction (or pattern of directions) of the desired icon(s).

The present disclosure is presented generally in the following structure. Some terms as used herein are defined for clarity. An embodiment of an exemplary computing system, which is actually representative of any computing system on which user interfaces may be display and interfaced with by a user, is described with reference to FIG. 1a. FIGS. 1b-1e illustrate sample conceptual configurations of menus, and exemplary navigation thereof. Embodiments of the user interface systems and methods for use on computing devices with small screens or other systems without a mouse, such as a cell phone, PDA, gaming device, MP3 or media player, or tablet PC, are described in conjunction with FIG. 2a and FIG. 2b. An example embodiment on a handheld device that can sense movement or position, such as an Apple iPhone or iTouch, will be described in conjunction with FIG. 2c. Methods for determining icon selection within a graphical menu based on cursor position will be described in conjunction with FIGS. 3, 4a-4b, and 5a-5c. FIGS. 6a and 6b are flowcharts illustrating operation of a computing device according to embodiments. Another embodiment including computer screen examples is discussed in conjunction with FIGS. 7a-7c. Other contemplated embodiments are discussed, including use of sound as a supplement to or replacement for display of a graphical menu.

DEFINITIONS OF CERTAIN TERMS

A "graphical menu" can include one or more graphical or textual objects, such as icons, where each of the objects is representative of a particular menu option.

An "icon" can be a component of a graphical menu that could be anything displayed on the screen that is visually distinguishable, such as a picture, button, frame, drawing, text, etc.

An "initial cursor position" can include a screen location of a cursor at the time the graphical menu system is initiated. The graphical menu is typically displayed around the initial cursor position and sufficient movement from this position is typically required for an icon to be selected.

A "home region" is the region around the initial cursor position, and including the initial cursor position. The home region may extend different distances from the initial cursor position, such as just a distance of a few millimeters on the display device to a few centimeters or more on the display device. Depending on the embodiment, the home region may be centered around the initial cursor position or may be offset such that the initial cursor position is closer to one edge (e.g., a top edge) of the home region than to an opposite edge (e.g., the bottom edge) of the home region. A home region may also be determined based on a location where a user has interfaced with a display device, where there may not be a cursor at all, such as a location where a touchscreen was touched by a finger or stylus of the user or where the finger or stylus moved in a predetermined pattern on the touchscreen.

A "temporarily selected icon" can include an icon within a graphical menu that has been temporarily chosen by the user, but has not yet been selected such that the particular menu option associated with the temporarily selected icon has not yet been initiated. Rather, the graphical menu is displayed so that the user can confirm that the temporarily selected icon is the desired icon. If the user is not satisfied with the indicated temporary selection, the user can choose a different icon within the graphical menu or choose no icon. A temporarily selected icon may be displayed in such a way as to allow the user to visually distinguish it from icons that are not temporarily selected.

A "permanently selected icon" (or simply "selected icon") can include an icon that has been selected by the user. When an icon is permanently selected, a software function associated with the icon is initiated by the program or operating system. An icon may be permanently selected in various manners, depending on the embodiment, some of which are described in further detail below.

Computing Systems

In some embodiments, the computing devices, computing systems, mobile devices, workstations, computer clients and/or servers described herein may comprise various combinations of components, such as the exemplary combinations of components illustrated in FIG. 1a-1e. Discussion herein of one or more specific types of computing devices should be construed to include any other type of computing device. Thus, a discussion of a method performed by a mobile computing device is also contemplated for performance on a desktop workstation, for example.

FIG. 1a is a block diagram illustrating one embodiment of a computing system 100 that may be used to implement certain systems and methods described herein. For example, the computing system 100 may be configured to execute software modules that cause the display of a menu around an area of focus (e.g., a current cursor position or a position on a touch screen that is touched by a finger or stylus) on a display device 104. Below is a description of exemplary components of the computing system 100.

The computing system 100 includes, for example, a personal computer that is IBM, Macintosh, or Linux/Unix compatible. In one embodiment, the computing system 100 comprises a server, a desktop computer, a laptop computer, a mobile computer, a cell phone, a personal digital assistant, a gaming system, a kiosk, an audio player, any other device that utilizes a graphical user interface (including office equipment, automobiles, airplane cockpits, household appliances, automated teller machines, self-service checkouts at stores, information and other kiosks, ticketing kiosks, vending machines, industrial equipment, etc.) and/or a television. for example. In one embodiment, the exemplary computing system 100 includes a central processing unit ("CPU") 105, which may include one or more conventional or proprietary microprocessor. The computing system 100 further includes a memory 108, such as one or more random access memories ("RAM") for temporary storage of information, a read only memory ("ROM") for permanent storage of information, and a mass storage device 102, such as a hard drive, diskette, flash memory drive, or optical media storage device. The modules of the computing system 100 may be connected using a standard based bus system. In different embodiments, the standard based bus system could be Peripheral Component Interconnect ("PCI"), PCI Express, Accelerated Graphics Port ("AGP"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows 95, Windows 98, Windows NT, Windows 2000, Windows XP, Windows Vista, Windows 7, Windows Mobile, Unix, Linux (including any of the various variants thereof), SunOS, Solaris, mobile phone operating systems, or other compatible operating systems. In Macintosh systems, the operating system may be any available operating system, such as MAC OS X or iPhone OS. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 includes one or more input/output (I/O) devices and interfaces 110, such as a keyboard, trackball, mouse, drawing tablet, joystick, game controller, touchscreen (e.g., capacitive or resistive touchscreen) touchpad, accelerometer, and printer, for example. The computing system also includes a display device 104 (also referred to herein as a display screen), which may also be one of the I/O device 110 in the case of a touchscreen, for example. In other embodiments, the display device 104 may include an LCD, OLED, or other thin screen display surface, a monitor, television, projector, or any other device that visual depicts user interfaces and data to viewers. The display device 104 provides for the presentation of GUIs, application software data, and multimedia presentations, for example. The computing system 100 may also include one or more multimedia devices, such as speakers, video cards, graphics accelerators, and microphones, for example.

In the embodiment of FIG. 1, the I/O devices and interfaces 110 may provide a communication interface to various external devices. For example, the computing system 100 may be electronically coupled to a network, such as one or more of a LAN, WAN, or the Internet, for example, via a wired, wireless, or combination of wired and wireless, communication link(s). Such a network may allow communication with various other computing devices and/or other electronic devices via wired or wireless communication links.

In the embodiment of FIG. 1, the computing system 100 also includes a user interface module 106 that may be executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 1, the computing system 100 is configured to execute the user interface module 106, among others, in order to provide user interfaces to the user, such as via the display device 104, and monitor input from the user, such as via a touchscreen sensor of the display device 104 and/or one or more I/O devices 110, in order to navigate through various menus of a software application menu, for example.

In general, the word "module," as used herein, refers to logic embodied in hardware or firmware, or to a collection of software instructions, possibly having entry and exit points, written in a programming language, such as, for example, Java, Javascript, ActionScript, Visual Basic, Lua, C, C++, or C#. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In other embodiments, the computing system may include fewer or additional components than are illustrated in FIG. 1*a*. For example, a mobile computing device may not include a mass storage device 102 and the display device 104 may also be the I/O device 110 (e.g., a capacitive touchscreen). In some embodiments, two or more of the components of the computing system 100 may be implement in one or more field programmable gate array (FPGA) or application specific integrated circuit (ASIC), for example.

Examples of Systems and Methods

Figure 1B:
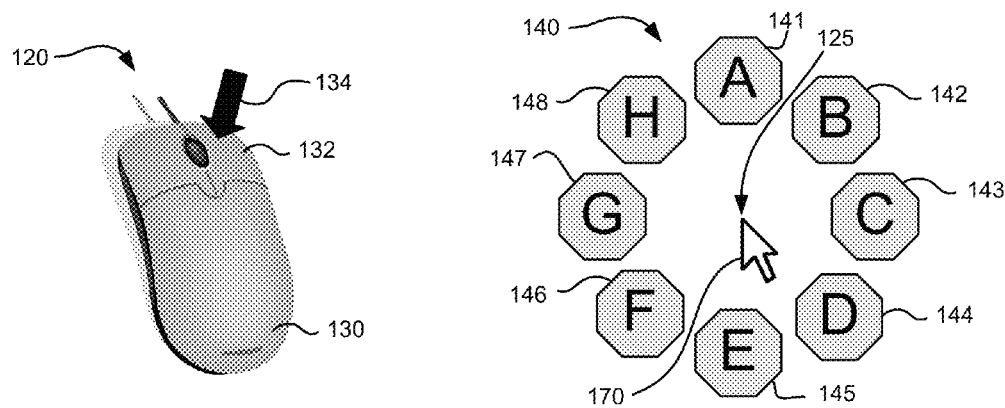
FIG. 1b illustrates an example of a graphical menu and an example of mouse activity that could be used to initiate its display.

In FIG. 1*b*, view 120 illustrates a mouse 130 comprising a right button 132. In view 120, a user depresses right mouse button 132 of mouse 130, with depression of the right mouse button illustrated with arrow 134. In one embodiment, depressing the right mouse button 132 initiates display of a graphical menu 140 on the display screen centered around initial cursor position 125 on the display device. In other embodiments, other operations may be performed on the mouse 120 (or other input device) in order to initiate display of the graphical menu 140. In the embodiment of FIG. 1*b*, the graphical menu 140 comprises one or more icons (in this example, eight octagonal icons labeled 141-148). Graphical menus and their component icons can vary in appearance and functionality, as will be described below.

The example graphical menu 140 may be displayed on top of whatever else might be displayed on the display screen, with some portions of the graphical menu transparent in some embodiments. In the example of FIG. 1*b*, the graphical menu 140 is displayed so that it is centered around the initial cursor position 125.

Figure 1C:
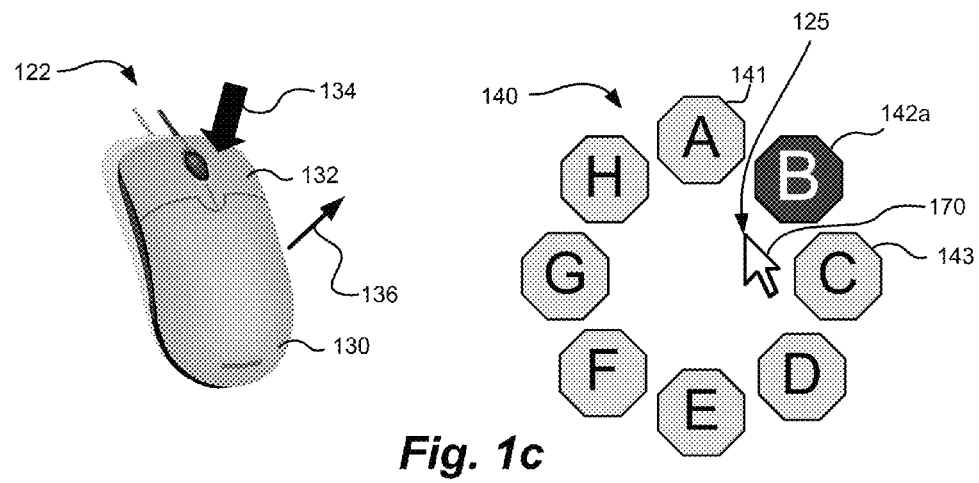
FIG. 1c illustrates mouse activity that could be used to temporality select an icon within the graphical menu of FIG. 1b.
Figure 1D:
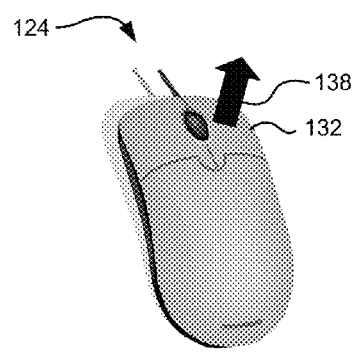
FIG. 1d illustrates mouse activity that could be used to permanently select the temporarily selected icon of FIG. 1c.

For the purposes of the series of events illustrated in FIG. 1*b*, FIG. 1*c*, and FIG. 1*d*, it is assumed that by default, display of the graphical menu 140 is centered on initial cursor position 125 (e.g., the cursor position when the user initiated displayed of the graphical menu, such as by right clicking the mouse 130).

FIG. 1*c* illustrates in view 122 a mouse movement that could be used to temporality select the icon 142 (FIG. 1*b*), such that the icon 142*a* (FIG. 1*c*) is temporarily selected. As illustrated in view 122, the user continues action 134 of depressing the right mouse button 132 and, in this example, moves the mouse 130 superiorly and to the right, along the path depicted by arrow 136. This movement of the mouse causes cursor 170 to move superiorly and to the right on the display device on which the graphical menu 140 is displayed. Thus, FIG. 1*c* illustrates cursor 170 moved from the initial cursor position 125 towards icon 142*a*.

As the cursor 170 approaches a portion of the graphical menu, an icon within the graphical menu is temporarily chosen and displayed in such a way as to visually distinguish it from unselected icons within the graphical menu. Thus, the graphical menu 140 shows the temporarily selected icon 142*a* displayed in a way that differentiates it from its original appearance as icon 142 (FIG. 1*b*). In the example of FIGS. 1*b* and 1*c*, icon 142 in FIG. 1*b* has changed to icon 142*a* in FIG. 1*c* by changing background and font colors of the icon 142, in order to indicate that icon 142 has been temporarily selected. There are many ways that an icon could change to depict that it is temporarily selected and differentiate it from icons that are not chosen. For example, an icon may become animated when temporarily selected, may display a modified or different image or text, or may be transformed in any other manner.

As noted above, in this exemplary embodiment the user is not required to position the cursor 170 directly over an icon in order to select that icon. As will be discussed in more detail below, only minimal movement toward an icon may be required to select it, increasing efficiency and decreasing necessary mouse movement and the potential for repetitive motion injury.

FIG. 1*d* demonstrates how the user indicates that the temporarily selected icon 142*a* (FIG. 1*c*) is permanently selected, which represents a final choice for this interaction with the graphical menu and the graphical menu is no longer displayed. As illustrated in view 124, the user releases mouse button 132 such that the button moves in a direction depicted by arrow 138 (e.g., releasing the right button 132). Thus, in the embodiment of FIGS. 1*b*, 1*c*, and 1*d*, an icon is temporarily selected by depressing the right button 132 in order to initiate display of the graphical menu, moving the cursor 170 towards (and/or partially or fully over) a desired icon in order to temporarily select the icon, and releasing the right button 132 to permanently select the desired icon in order to initiate execution of an operation associated with the selected icon.

In the embodiment illustrated in FIG. 1*b*, graphical menu 140 is displayed symmetrically around initial cursor position 125. However, in another embodiment where there is a default icon choice, for example, the graphical menu could be asymmetrically positioned around the initial cursor position such that an icon is chosen by default. In one embodiment, the graphical menu 140 may be positioned such that a default icon is closer to the initial cursor position when the graphical menu 140 is initially displayed. With reference to FIG. 1*c*, for example, if the initial cursor position is the position of cursor 170 shown in FIG. 1*c*, rather than position 125 indicated in the figure, the menu 140 may be initially displayed so that icon 142*a* is temporarily selected as a default. Depending on the embodiment, any of the icons in the graphical menu may be chosen by default, such as in response to options established by a user or based on frequency of use of respective icons, for example.

Figure 1E:
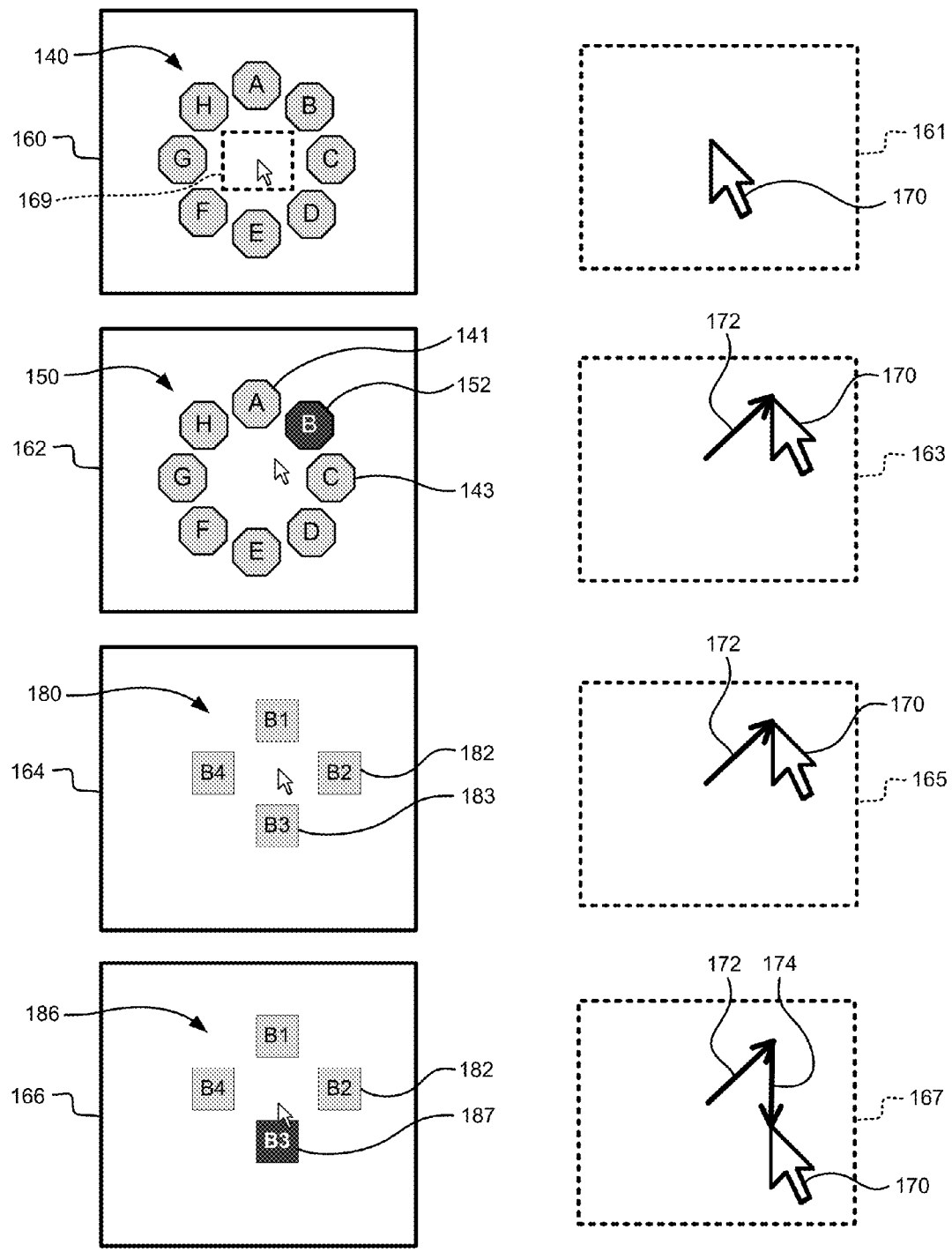
FIG. 1e illustrates how icons within a graphical menu, and icons of a second graphical menu, can be selected in response to exemplary movements of a cursor.

FIG. 1*e* illustrates how icons within a graphical menu, and display of a second graphical menu, can be selected in response to movements of a cursor. There is no limit to the number of choices that can be presented to the user using the graphical menus discussed herein. For example, the permanent selection of an icon in one graphical menu could initiate display of another graphical menu, as will be discussed in further detail with reference to FIG. 1 *e*. This could be repeated so that selection of an icon in a second graphical menu could open a third graphical menu, and the process may be repeated ad infinitum to present further graphical menus. One of the selections in a graphical menu could be to return to a previous graphical menu.

In FIG. 1 *e*, screen regions 160, 162, 164 and 166 represent the same physical screen region but at different stages in the navigation of a primary graphical menu (stages 160, 162) and a secondary graphical menu (stages 164, 166). Region 161 is a magnification of central region 169 of screen region 160, with its approximate size and location illustrated by a dashed rectangle 169 within region 160. Magnified central regions 163, 165, and 167 of screen regions 162, 164, and 166, respectively, are also shown, with the corresponding magnified regions having the same relationship as region 161 to screen region 160.

In FIG. 1 *e*, screen region 160 shows display of graphical menu 140 including icons labeled A-H that are arranged in an icon region surrounding the initial cursor position of cursor 170, depicted in both the dashed rectangle 169 and the magnified region 161 that represents the content of the same dashed rectangle 169. In one embodiment, display of the graphical menu 140 was initiated by user actions.

In screen region 162, the user has moved the cursor 170 superiorly and to the right along path 172, depicted in magnified region 163. In this embodiment, movement of cursor 170 toward icon 152 has caused icon 152 to be temporarily selected and its appearance has changed so that it can be visually differentiated from unselected icons, such as icons 141 and 143. As illustrated, icon 152 is temporarily selected before the cursor reaches the icon 152. In other embodiments, temporary selection of an icon may not occur until at least a predetermined portion of the cursor covers an icon. Various criteria for determining when icons are temporarily and/or permanently selected are discussed below.

In the example shown in FIG. 1 *e*, permanent selection of icon 152, such as by releasing the right mouse button when icon 152 is temporarily selected, for example, results in display of a new graphical menu 180. Depending on the embodiment, the display of graphical menu 180 shown in screen region 164 could be configured to occur in the following example circumstances: (1) Display of the second graphical menu 180 could occur as soon as the icon 152 (or other icon associated with display of the graphical menu 180) in the first graphical menu 150 is temporarily selected, (2) display of the second graphical menu 180 could occur after the icon 152 is permanently selected, such as by releasing the right mouse button or with one of the other techniques describe herein, or (3) display of the graphical menu 180 could occur after a time delay. This would allow the user to reposition the cursor 170 if an undesired icon is temporarily selected (e.g., rather than immediately replacing graphical menu 150 with graphical menu 180 when the undesired icon is temporarily selected). A selected time delay, such as 100 milliseconds, for example, could be set such that permanent selection of an icon, and display of a second menu in this example, would occur after an icon is temporarily selected for at least 100 milliseconds.

The screen region 164 depicts display of the secondary graphical menu 180 and removal of graphical menu 150, such as in response to one of the above-indicated interactions with icon 152. In this embodiment, the secondary graphical menu 180 is centered around a new initial cursor position, the position of the cursor in screen region 162 at the time that icon 152 was permanently selected. As discussed elsewhere herein, graphical menus can vary in their appearance and graphical menu 180 happens to have 4 square icons. Screen region 165 depicts a magnification of screen region 164, as described above.

Screen regions 166 and 167 illustrate what happens when the user moves the cursor inferiorly from the position illustrated in screen regions 164 and 165 along the path illustrated by arrow 174. Cursor movement inferiorly has caused the temporary selection of an icon 187 within graphical menu 186. Graphical menu 186 is the same as graphical menu 180 except that an icon has been temporarily selected. Specifically, graphical menu 186 has a temporarily selected icon 187 displayed in a way that differentiates it from unselected icons such as 182 and 183.

Implementation on Cell Phones, PDAs, Tablet PCs

Figure 2B:
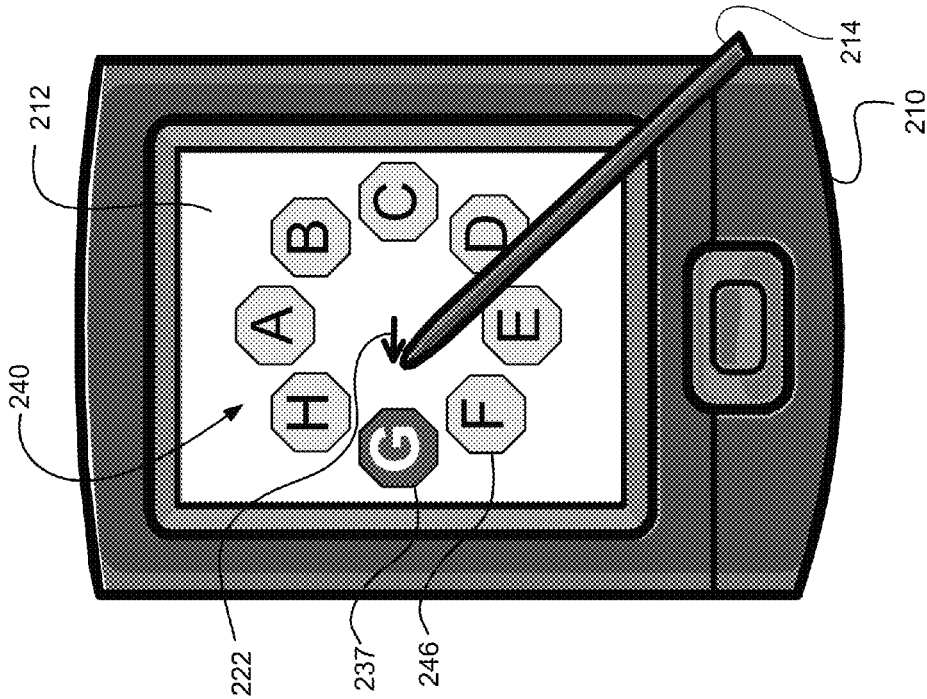
FIG. 2b further illustrates the use of a graphical menu on a handheld device, such as a cellular phone, PDA, or tablet computer.
Figure 2A:
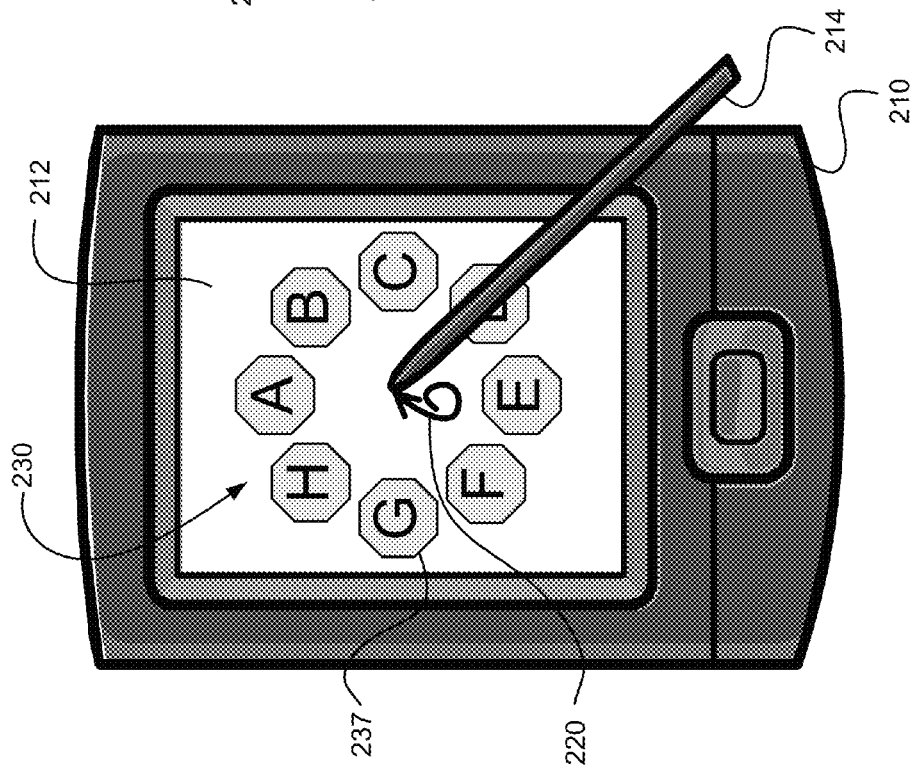
FIG. 2a illustrates an example use of a graphical menu on a handheld device, such as a cellular phone, PDA, or tablet computer.

Some computing systems with displays do not utilize a mouse for navigation and the user interfaces described herein can be implemented with other forms of navigation. For example, FIGS. 2*a* and 2*b* illustrate the implementation of an enhanced user interface using a stylus, but other navigation devices could be utilized, such as a finger controlled touch screen or directional navigation buttons, for example. In the description below, the device in FIG. 2*a* and FIG. 2*b* will be referred to as a cell phone, but it could be a PDA, tablet PC, or other device with a display screen 212. While the pointing device illustrated is a stylus 214, it could alternatively be the user's finger or other object.

In FIG. 2*a*, the user initiates an action that causes display of graphical menu 230. In this implementation, display of the graphical menu 230 is initiated by detection of a particular motion path 220 on the input screen 212. In this embodiment, motion path 220 comprises roughly the path that the user would use to draw the number "6" using the stylus 214. The user interface software that executes on the cell phone 210 could be configured to display other graphical display menus for other input tracings. For example, the interface software could be configured to display a different graphical menu in response to the user tracing a path similar to the letter "L" or any other pattern. Display of graphical menus could be initiated in many other ways, as will be described herein.

In this example, graphical menu 230 has eight hexagonal icons and is displayed centered about where the input pattern was completed on the display screen. Thus, in the embodiment of FIG. 2*a*, the initial cursor position is a terminal position of tracing 220. In other embodiments, the graphical menu 230 may be centered elsewhere, such as a start position of the tracing 220 or some intermediate position of the tracing 220, for example. Icon 237 is one of the eight icons within graphical menu 230.

The user can temporarily select an icon within the graphical menu 230 by moving the stylus 214 toward the desired icon. FIG. 2*b* shows an example where the user has moved the stylus 214 towards the left along path 222. This movement causes temporary selection of the closest icon, in this case the icon 237, which changes appearance in FIG. 2*b* in response to being temporarily selected, in order to allow it to be visually differentiated from the other unselected icons in the graphical menu 240, for example unselected icon 246.

Figure 2C:
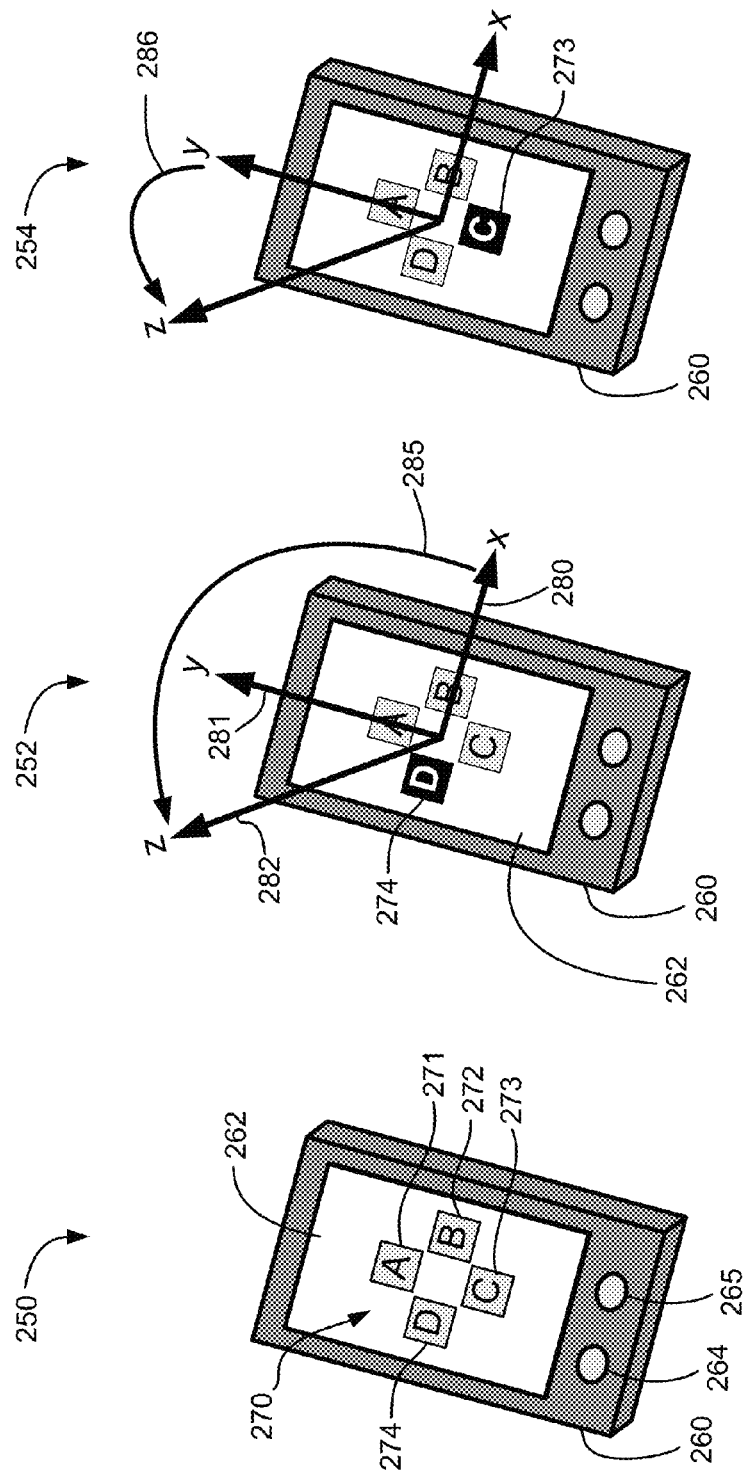
FIG. 2c illustrates an example use of a graphical menu on another handheld device that has the ability to monitor its position or movement.

FIG. 2*c* illustrates the use of a graphical menu 270 on another handheld device 260 that has the ability to monitor its position (e.g., orientation) or movement. The device 260 is a handheld device such as a cell phone (e.g., iPhone), PDA, tablet PC, portable music or media player, gaming device or other handheld device with a display screen. In another embodiment, device 260 could be an input device, such as a Wii controller or 3D mouse, where the screen is on another device.

In order to use this graphical menu system in the way that will be described in FIG. 2c, device 260 includes technology that allows it to sense its position and/or motion, such as one or more accelerometers. Device 260 has display screen 270 and may have one or more input devices 264 and 265, that could include buttons or other input devices. Device 260 is depicted in view 250 in an arbitrary orientation (e.g., position held by the user). As will be described, its position will be changed by the user in views 252 and 254 in order to indicate selection of icons.

In view 250 of FIG. 2c, graphical menu 270 is displayed on screen 262 and includes icons 271-274. The user initiated some action to cause the graphical menu to be displayed, for example one of the other techniques described herein. Additional ways the user could initiate display of graphical menu 270 include the pressing of a button, for example button 264, voice or other audible commands, touching the screen with two fingers in a predetermined pattern and/or location, or some positioning of device 260, such as shaking it side to side.

In view 252 of FIGS. 2c, x, y, and z axes are illustrated to indicate repositioning of the device by the user. The x axis and y axis are in the plane of screen 262 of device 260, along its short and long axis respectively, and the z axis is perpendicular to the screen. Motion path 285 illustrates that the user is physically rotating the device toward his left along the y axis. Device 260 detects movement of the device 260 along motion path 285 and temporarily selects the icon within the graphical menu that is positioned in the detected direction from the point of view of the center of the graphical menu. In this case, because the motion path 285 comprises rotation of the device 260 towards the left, the left icon 274 of the graphical menu 270 is temporarily selected. Once temporarily selected, one or more characteristics of icon 274 are changed (as shown by the dark background of icon 274 in view 252) in order to allow it to be visually differentiated from the remaining unselected icons.

In view 254 of FIGS. 2c, x, y, and z axes are again illustrated as in view 252. As illustrated by motion path 286, the user is rotating the device downward (toward him, rotating about the x axis). In response to this movement, the computing device temporarily selects the icon 273 at the bottom of the graphical menu 270. In this case, selected icon 273 is illustrated in a way to differentiate it from the remaining unselected icons. While views 252 and 254 illustrate rotation around specific axes, the user may rotate the device in any arbitrary direction to allow temporary selection of an icon at any position on the screen.

In one embodiment, an icon that is temporarily selected may be permanently selected without further user interaction (e.g., there really is no temporary selection, by maintaining the device 260 in an orientation to temporarily select an icon for a predetermined time period), by pressing a button, such as one of buttons 264, 265, or by any other input that may be provided by the user of the device 260.

In the example depicted in FIG. 2c, detection of "pouring" motions (e.g., motion 252 shows the device being tilted as if the user is pouring into icon 274) can be facilitated by tilt sensor(s) and/or accelerometer(s). In certain embodiments, sufficient number of such detection components can be provided so as to allow motion-based temporary selection and/or permanent selection of icons having both x and y components. For example, suppose than a fifth icon is provided between icons A and B (in first quadrant of the x-y plane). Then, a tilting motion towards such an icon can be detected by sensing a combination of motions about y and x axes (motions opposite to 285 and 286).

There are a number of other motion-based user inputs that can be implemented to achieve similar results. For example, a device can be jerked slightly towards an icon that the user wants to temporarily (or permanently) select. For such motions, one or more accelerometers can be provided and configured to detect two-dimensional motion along a plane such as a plane substantially parallel to the device screen.

Methods for Determining Icon Selection

There are many possible methods for determining if a user has selected an icon within a graphical menu. Several will be described herein, but others are contemplated that would provide the same or similar functionality.

Figure 3:
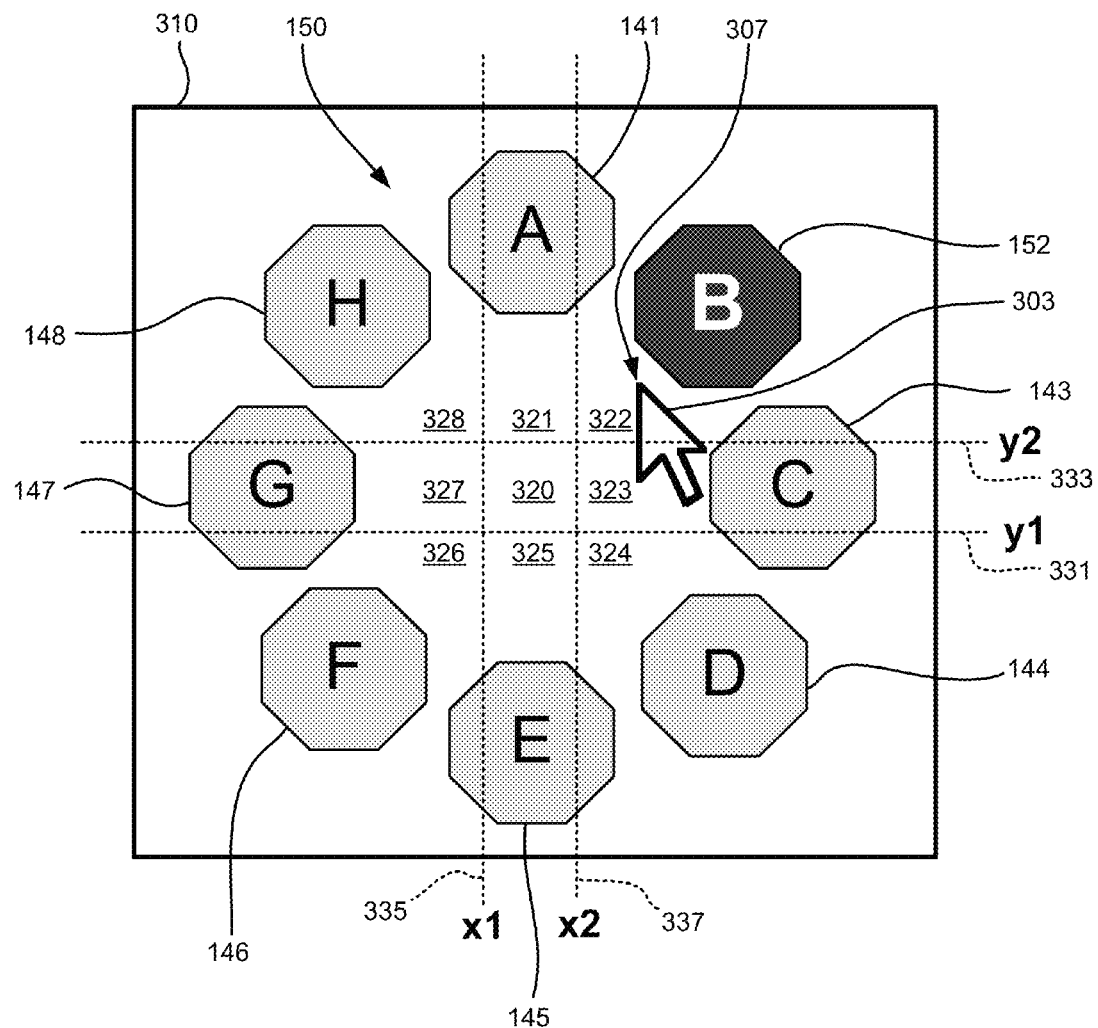
FIG. 3 is a diagram illustrating screen regions of a sample graphical menu, where movement of the cursor between the screen regions in certain manners may be used to determine which icon within the graphical menu has been temporarily and/or permanently selected by the user.

FIG. 3 is a diagram illustrating screen regions 320-328 of a graphical menu 150, where movement of a cursor 303 onto certain screen regions may be used to determine which icon within the graphical menu has been selected (or temporarily selected) by the user. Using such a mapping scheme, an icon within the graphical menu may be selected when the user positions the cursor 303 within a screen region corresponding to an icon.

In this example, graphical menu 150 depicts eight icons, 141, 152, 143, 144, 145, 146, 147, and 148. The screen is divided into multiple regions 320-328, with regions 321-328 corresponding to respective icons and region 320 centered on the initial cursor position, around which the graphical menu is displayed. In this embodiment, each of the regions 321-328 includes at least a portion of its respective icon. In this example, region 320 is centered about the initial cursor position at the time the graphical menu was displayed. In the example shown, region 321 corresponds to icon 141, region 322 to icon 152, region 323 to icon 143, region 324 to icon 144, region 325 to icon 145, region 326 to icon 146, region 327 to icon 147, and region 328 to icon 148.

Determining whether the cursor falls within a region is straightforward in this example as the regions are bounded by horizontal lines 331 and 333 and vertical lines 335 and 337 which may be represented by x and y coordinates in a computer system. For the purposes of illustration, lines 335, 337, 331 and 333 are labeled with "x1", "x2", "y1", and "y2", respectively, in order to indicate their positions in the coordinate system of screen 310 as follows:

Vertical line 335 is at position x1.
Vertical line 337 is at position x2.
Horizontal line 331 is at position y1.
Horizontal line 333 is at position y2.

In this embodiment, if the position of cursor 303 at any given time is represent by coordinates (x,y), determining the region that the cursor is positioned can be accomplished as follows:

If x>x1 and x<x2 and y≥y2 then in region 321.
If x>x1 and x<x2 and y>y1 and y<y2 then in region 320.
If x>x1 and x<x2 and y≤y1 then in region 325.
If x≥x2 and y≥y2 then in region 322.
If x≥x2 and y>y1 and y<y2 then in region 323.
If x≥x2 and y≤y1 then in region 324.
If x≤x1 and y≥y2 then in region 328.
If x≤x1 and y>y1 and y<y2 then in region 327.
If x≤x1 and y≤y1 then in region 326.

Figure 4A:
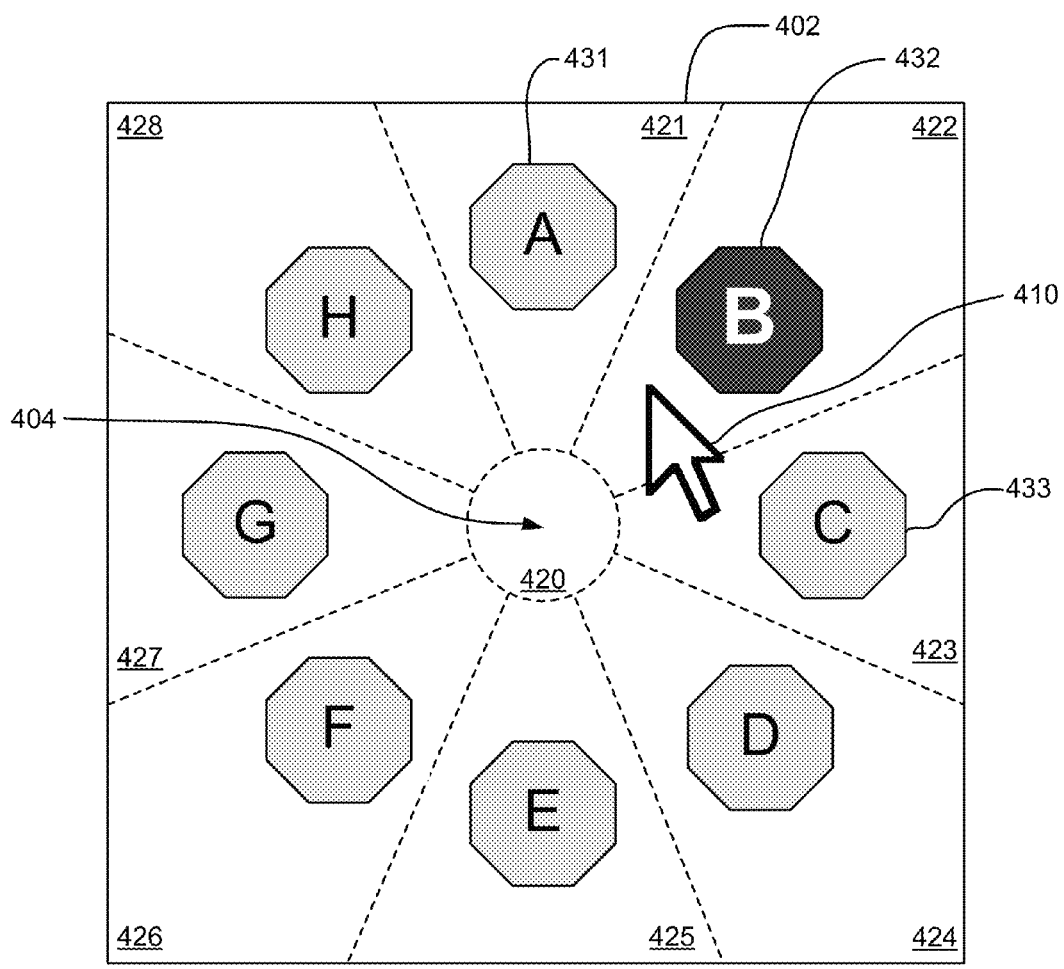
FIG. 4a is a diagram illustrating another embodiment of a graphical menu including screen regions that may be used to determine which icon within the graphical menu has been selected by the user.

FIG. 4a is a diagram illustrating another embodiment of a graphical menu including screen regions that may be used to determine which icon within a graphical menu has been selected by the user. In this embodiment, screen 402 includes a graphical menu having 8 hexagonal icons. Position 404 indicates the initial cursor position when the graphical menu was rendered at its current position on the screen.

In this example, the screen 402 is divided into radial regions 421-428 and a central home region 420 centered in the graphical menu. In this embodiment, radial regions 421-428 each correspond to a respective icon in the graphical menu. For example, region 421 corresponds to icon 431, region 422 corresponds to icon 432, and region 423 corresponds to icon 433.

When cursor 410 is positioned within home region 420, no icon is selected. When the user moves the cursor out of home region 420 and into another region, the icon within that region is temporarily selected. In this case, cursor 410 has been moved by the user into region 422. This has caused temporary selection of the corresponding icon 432 which is displayed in such a way as to differentiate it from the unselected icons within the graphical menu. In this example the temporarily selected icon is displayed as darker and the letter inside it displayed with a different font and color, but there are many other ways that a temporarily selected icon could be visually distinguished from unselected icons.

Figure 4B:
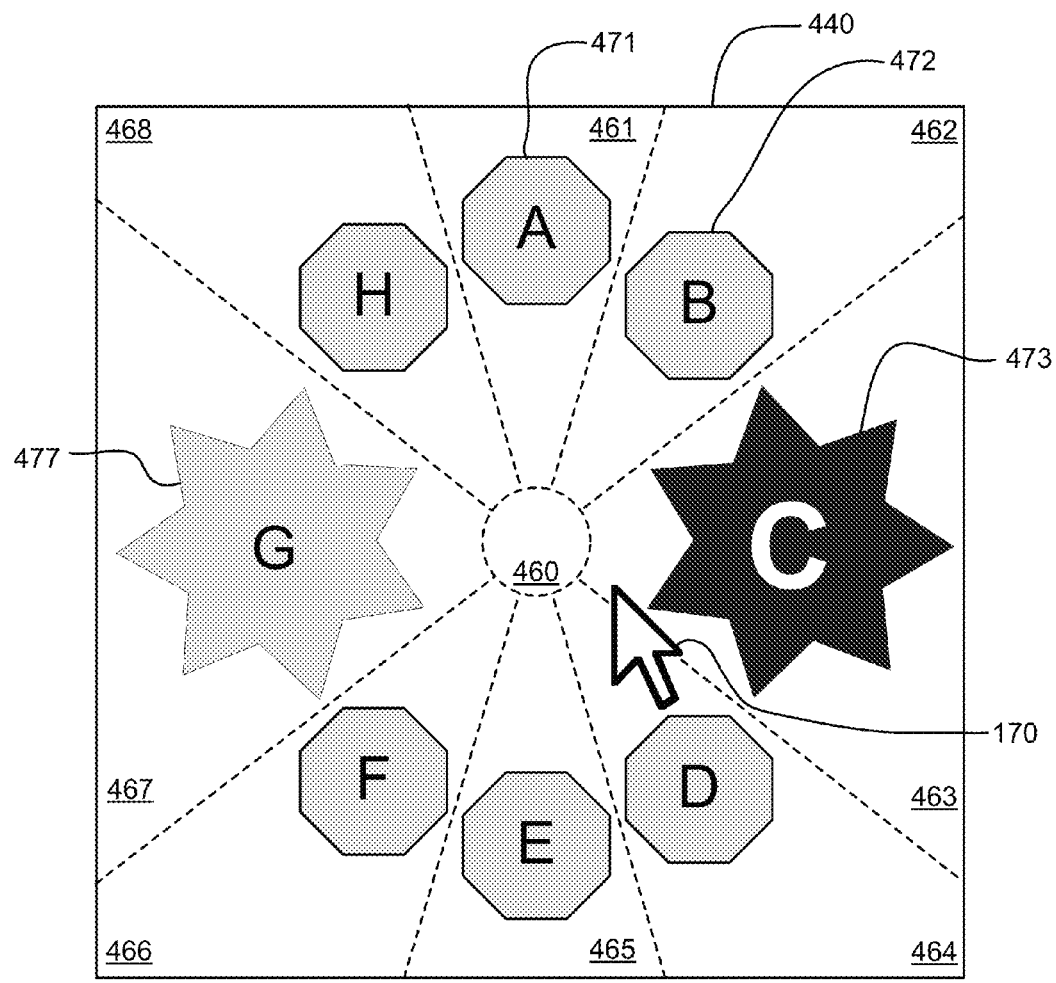
FIG. 4b is a diagram illustrating another embodiment of a graphical menu including screen regions that may be used to determine which icon within the graphical menu has been selected by the user.

FIG. 4b is a diagram illustrating another embodiment of a user interface including screen regions 461-468 that may be used to determine which icon within a graphical menu has been selected by the user, where the user interface includes asymmetric icons and asymmetric screen regions used for detection of icon selection. In the embodiment of FIG. 4b, the graphical menu comprises eight icons within screen region 440. This example demonstrates that unselected icons within a graphical menu may differ in appearance, including features such as size and shape. In addition, the size and/or shape of the screen regions associated with each icon in a graphical menu may differ.

The screen regions associated with each icon can differ in size and shape. This may be advantageous in cases where some icons are more commonly chosen than other. More commonly selected icons might be assigned larger associated screen regions to make it easier for the user to select those areas and therefore the respective icon. While the relative size of the various screen regions could vary independently of the size of the icons in the function menu, in this example icons 473 and 477 are larger than the other icons in the graphical menu, and their associated screen regions 463 and 467 are also larger than the other screen regions.

As in a previous example, home region 460 is centered where the cursor was positioned at the time the graphical menu was displayed. When cursor 170 is positioned within the home region, no icon is selected. In other embodiments, however, a default icon may be temporarily selected even when the cursor 170 is initially positioned within the home region 460.

The remainder of screen region 440 is divided into eight regions, one each corresponding to the icons within the graphical menu, with screen regions 461-468 depicted using underlined text in the figure. For example, region 461 is associated with unselected icon 471, region 462 with unselected icon 472, region 463 with selected icon 473, and region 467 with unselected icon 477.

In this example, the user has positioned cursor 170 in region 463, causing temporary selection of icon 473. In this example, icon 473 had an appearance similar to 477 when it was unselected, but upon temporary selection of the icon 473, the icon 473 changed its appearance to allow it to be differentiated from the unselected ions. Temporarily selected icon 473 is darker than the unselected icons and the letter within it has a different font, larger, bold, and white instead of black color.

Figure 5A:
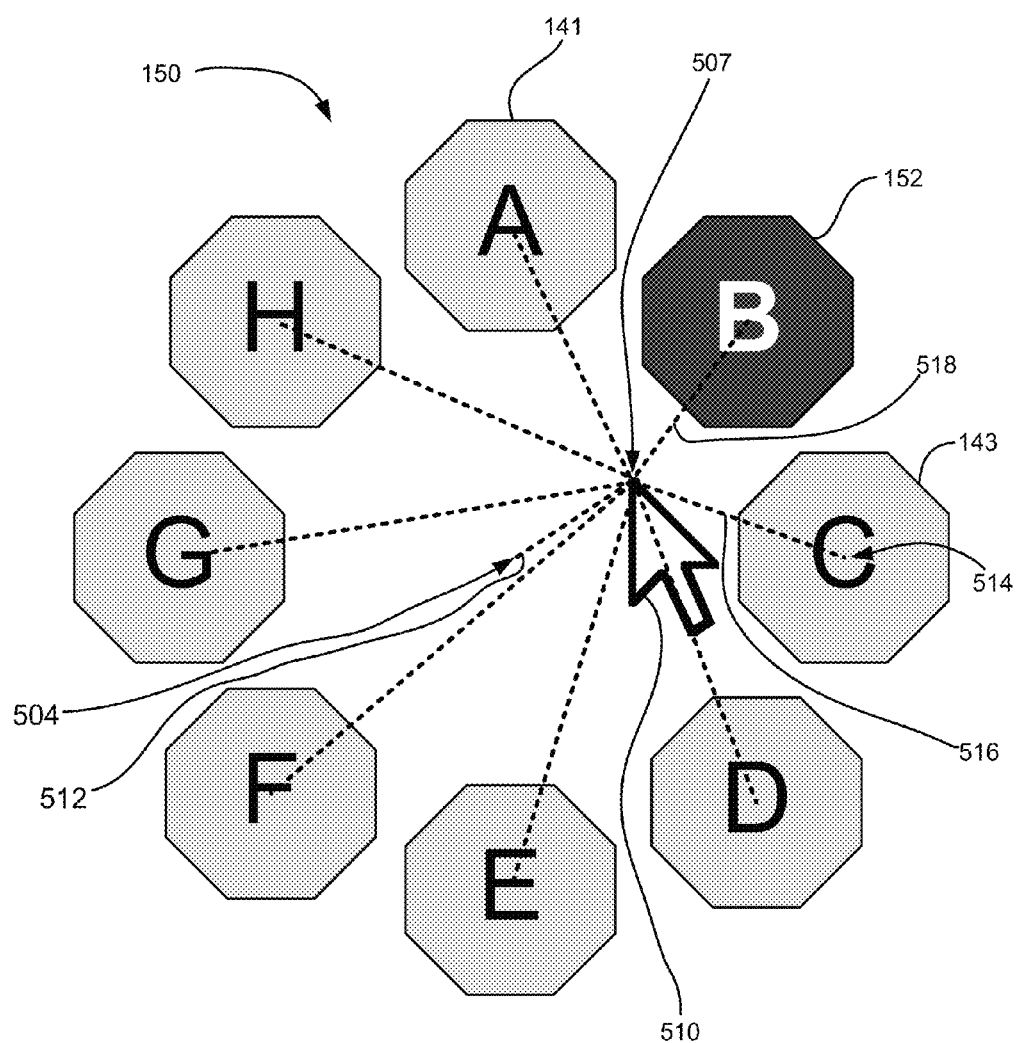
FIG. 5a is a diagram illustrating another embodiment of a graphical menu.
Figure 6A:
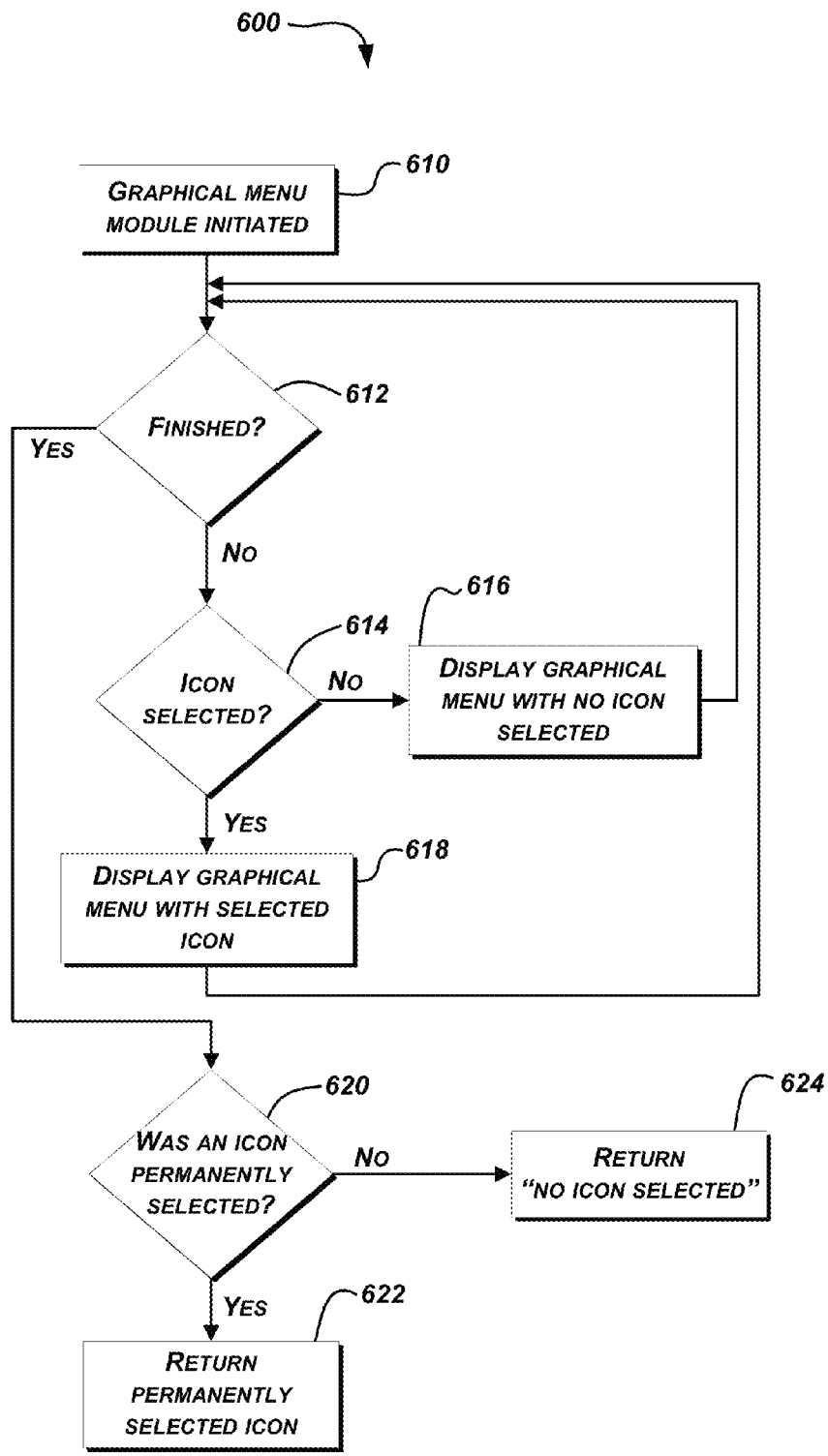
FIG. 6a is a flowchart illustrating one embodiment of a method for operating a graphical menu.
Figure 6B:
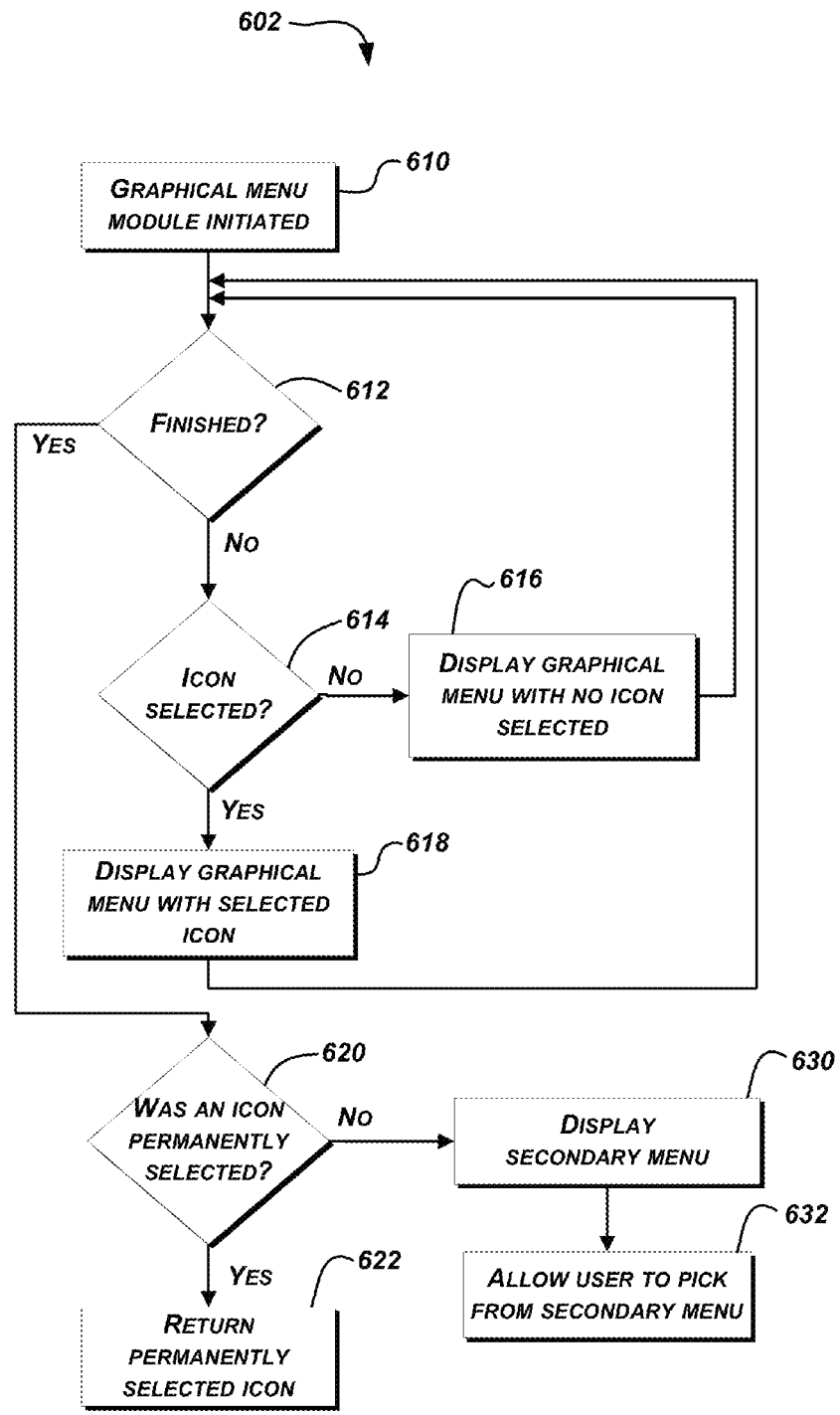
FIG. 6b is a flowchart illustrating another embodiment of a method for operating a graphical menu.

FIG. 5a is a diagram illustrating another embodiment of a graphical menu. In this embodiment, instead of dividing the screen into regions, this technique uses distance between the cursor and icons to determine whether and which icon is selected.

For the purposes of describing this technique, the initial cursor position 504 is the screen position at which the graphical menu was initially displayed.

In the technique depicted in FIG. 5a, each icon is associated with a single position (icon location point). In the example shown, graphical menu 150 has eight hexagonal icons, including icons 141, 152, and 143. In this example, each icon's location point is at the icon center. However, an icon's location point could be assigned to any position within the icon or even outside of the icon. In the example shown, the icon location point for icon 143 is at position 514.

The location of user controlled cursor 510 is screen position 507 in the figure. In the figure, the distance between each icon's location point and the cursor position 507 is depicted by a dashed line. For example, dashed line 516, which would be invisible to the user of the graphical menu, represents the distance between cursor position 507 and icon location point 514 of icon 143.

Determining whether an icon has been selected and if so, which one, can be accomplished by using the distances between the cursor position and icon location points. Determining whether any icon has been selected can be determined in a number of ways. Two non-limiting examples are described below.

With one technique, the distance between the cursor position 507 and initial cursor position 504 is determined, depicted in the figure as dashed line 512. This distance is compared to a threshold distance, wherein when the distance is above the threshold distance (e.g., the cursor is close enough to an icon), an icon is temporarily selected. Thus, once it is determined that the cursor is positioned such that an icon should be temporarily selected, the computing system determines which of the icons is the selected icon. In one embodiment, a particular icon is identified for temporary selection by assessing the distances between the cursor location 507 and icon location points, and then selecting the icon with the smallest cursor to icon location point distance. It is possible that two or more icons might have equal cursor to icon location point distances. This situation may be resolved in several ways, such as (1) no icon would be selected until the user repositions the cursor so that the choice is unique, (2) icons could be assigned priorities so that the highest priority icon is chosen in the case of distance ties, or (3) an icon is randomly chosen from among this group, for example.

In the example shown, distance 518 is the smallest cursor position to icon location distance, causing icon 152 to be temporarily selected. Note that appearance of selected icon 152 differs from the other unselected icons in graphical menu 150.

In another embodiment, rather that performing the step of first determining whether an icon is selected, such as based on a distance between the cursor and an initial cursor position, and then determine which specific icon has been selected, the computing device may repeatedly recalculate distances between the cursor position 507 and one or more icon locations until one of the distances falls below a threshold.

Figure 5B:
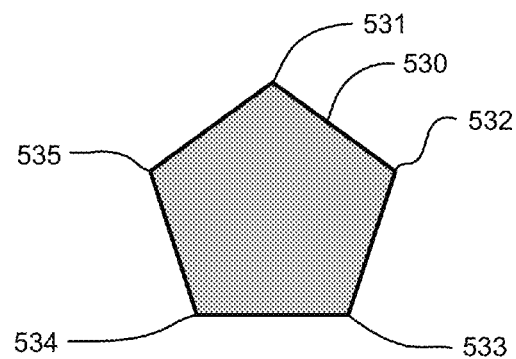
FIG. 5b illustrates an icon with multiple icon location points.
Figure 5C:
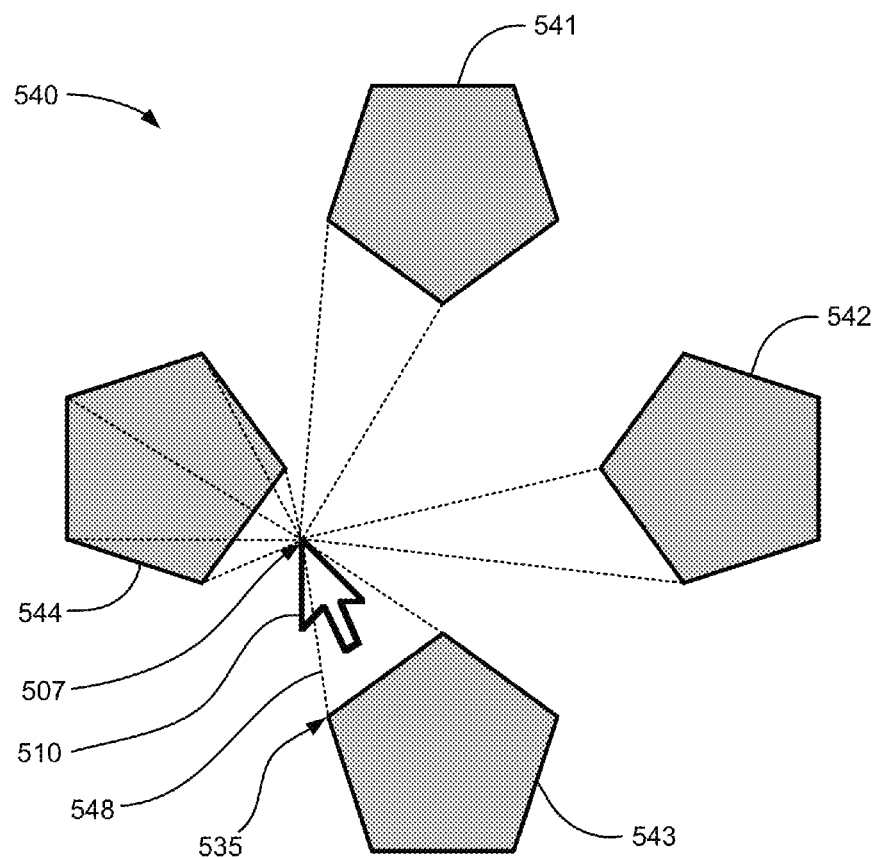
FIG. 5c illustrates a graphical menu including icons with multiple icon location points.

FIG. 5b and FIG. 5c illustrate another technique in which distance is used to determine whether an icon is temporarily or permanently selected and, if so, which one. The technique illustrated in FIG. 5a utilizes a single icon location point of each icon. However, multiple icon location points can be utilized for icons.

FIG. 5b illustrates icon 530 with multiple icon location points 531-535 positioned at its vertices. However, icon location points can be assigned at any positions within an icon, along its edge or outside of it.

FIG. 5c illustrates a graphical menu 540 having four icons, 541-544. As in FIG. 5b, each of these icons has 5 icon location points, one at each of its vertices. The position 507 of cursor 510 is illustrated in the figure. Dashed line 548 depicts the distance between cursor position 507 and one of the icon location positions, 535 of icon 543. The figure illustrates dashed lines between cursor position 507 and several of the other icon location points of the icons in the graphical menu. In practice, the distance from the cursor location to every icon location point may be determined.

The process of determining whether and which icon would be selected with multiple icon locations per icon may be similar to that used with a single icon location per icon. In the case of multiple icons locations per icon, the cursor to icon location distance for each icon is the minimum distance of its icon location points to the cursor location.

Flowcharts

FIG. 6a is a flowchart 600 illustrating one embodiment of a method that could be used for display and interaction of a user with a graphical menu. As discussed above with FIG. 1e, graphical menus can be cascaded, as discussed in reference to the flowchart in FIG. 6b. There is no limit to the number of levels that could be implemented in such a cascade or tree of graphical menus. The method of FIG. 6a may be performed on any suitable computing device, such as one of the computing devices discussed above with reference to FIG. 1a. Depending on the embodiment, the method of FIGS. 6a and 6b may include fewer or additional blocks and the blocks may be performed in a different order than is illustrated.

In flowchart 600, a graphical menu module that is configured to display graphical menus is first initiated in block 610. The graphical menu module may include software code that is executed by a computing device, such as a mobile or desktop computing device. The graphical menu module is configured to cause the computing device to display the graphical menu and detect interactions of the user (e.g., a cursor controlled by the user or a stylus or finger touching the display screen). In one embodiment, the graphical menu module comprises a standalone software application that interfaces with other software applications on a computing device. Alternatively, the graphical menu module may be incorporated into another software application, such as a word processor, graphic application, image viewing application, or any other software application. Alternatively, the graphical menu module could be part of the operating system. Depending on the embodiment, the initiation of the graphical menu module might occur as a result of a user's action, for example depression of the right mouse button, or could occur automatically as a result a program or the operating system initiating the system to obtain user input. In response to initiation of the graphical menu module, a graphical menu is provided via a display device, such as a monitor or screen of a mobile computing device.

In block 612, the graphical menu module determines whether the user has finished using the displayed graphical menu. For example, by releasing the right mouse button (possibly indicating a desire to permanently select a temporarily selected icon and initiate execution of a process associated with the icon), the user may indicate that he has finished with the current instance of the graphical menu system. Alternatively, a user may indicate that he is finished with a graphical menu by moving a cursor off of the graphical menu, such as outside an area of the screen where the graphical menu is displayed. In one embodiment, certain graphical menus may "time out," so that if no user input is received for a predetermined time period, the user is considered to be finished with the graphical menu and the method continues to block 620.

If the user is not finished using the displayed graphical menu, in block 614 the system determines whether an icon is temporarily selected using, for example, one of the techniques described herein.

If no icon has been temporarily selected, in block 616 the graphical menu is displayed with no icon selected (e.g., shaded or otherwise distinguished from other icons) in block 616. The method then loops back to block 612 and again senses whether the user is finished with the graphical menu.

If an icon has been temporarily selected, in block 618 the graphical menu is displayed with the selected icon displayed in a way that differentiates it from the unselected icons, as described herein. The method then loops back to block 612 and again senses whether the user is finished with the graphical menu.

If the graphical menu module determines that that the user is finished in block 612, the method branches to block 620 and determines whether an icon was permanently selected. If an icon is determined to have been permanently selected, the method branches to block 622 where the graphical menu module returns the identity of the permanently selected icon to the program or operating system that the graphical menu module is configured to interact with. In another embodiment, permanent selection of an icon initiates display of a secondary menu comprising a plurality of icons about the current cursor position. Thus, blocks 612-624 may be repeated with respect to the secondary menu in order to determine if an icon of the second memory is selected. The process may be repeated any number of times in relation to any number of different menus that may be navigated to via other graphical menus.

At block 620 if no icon has been permanently selected, the method branches to block 624 where the graphical menu module returns an indication that no icon of the graphical menu was permanently selected to the program or operating system that the graphical menu module is configured to interact with.

FIG. 6b is a flowchart 602 with logic similar to FIG. 6a, except for blocks 630 and 632. In the case that no icon was selected, a secondary menu is displayed in block 630. The user can pick from this secondary menu in block 632. This secondary menu could be a graphical menu, as described herein, or could be a conventional menu, as illustrated in FIG. 7c.

Figure 7B:
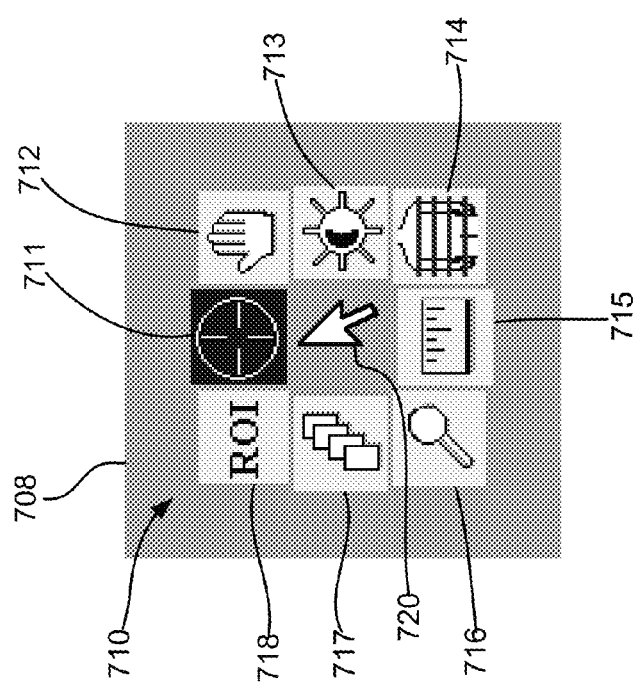
FIG. 7b illustrates an exemplary graphical menu superimposed on a complex screen output of a program that called the graphical menu.
Figure 7A:
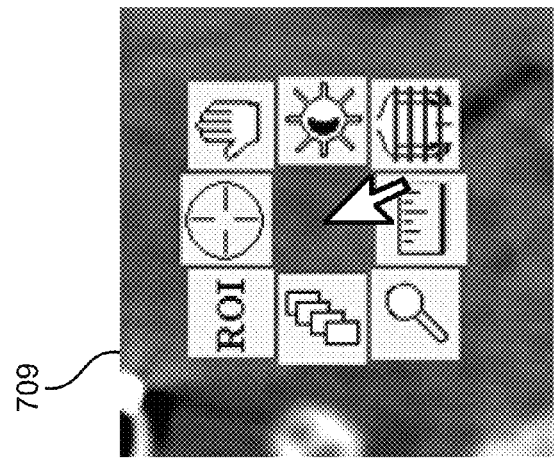
FIG. 7a illustrates an exemplary graphical menu superimposed on a homogenous screen.

FIG. 7a illustrates a graphical menu superimposed on a homogenous screen. In this embodiment, the graphical menu 710 comprises eight square icons, 711-718. Cursor 720 is positioned near icon 711 causing icon 711 to be selected, using one of the techniques described herein. The selected icon 711 appears color inverted with respect to the other unselected icons in the graphical menu, allowing the user to easily differentiate the selected icon from unselected icons.

FIG. 7b illustrates a graphical menu superimposed on a complex screen output of a program that called the graphical menu. In particular, the graphical menu is superimposed on the contents of the screen 709, in this case a gray scale image. In addition, the cursor is superimposed on top of both the graphical menu and the underlying image on the screen. In this example, the cursor position is near the initial cursor position and no icon within the graphical menu is selected. In one embodiment, the graphical menu may have some transparency, as illustrated in this figure. In one embodiment, a level of transparency can be selected by the user.

Figure 7C:
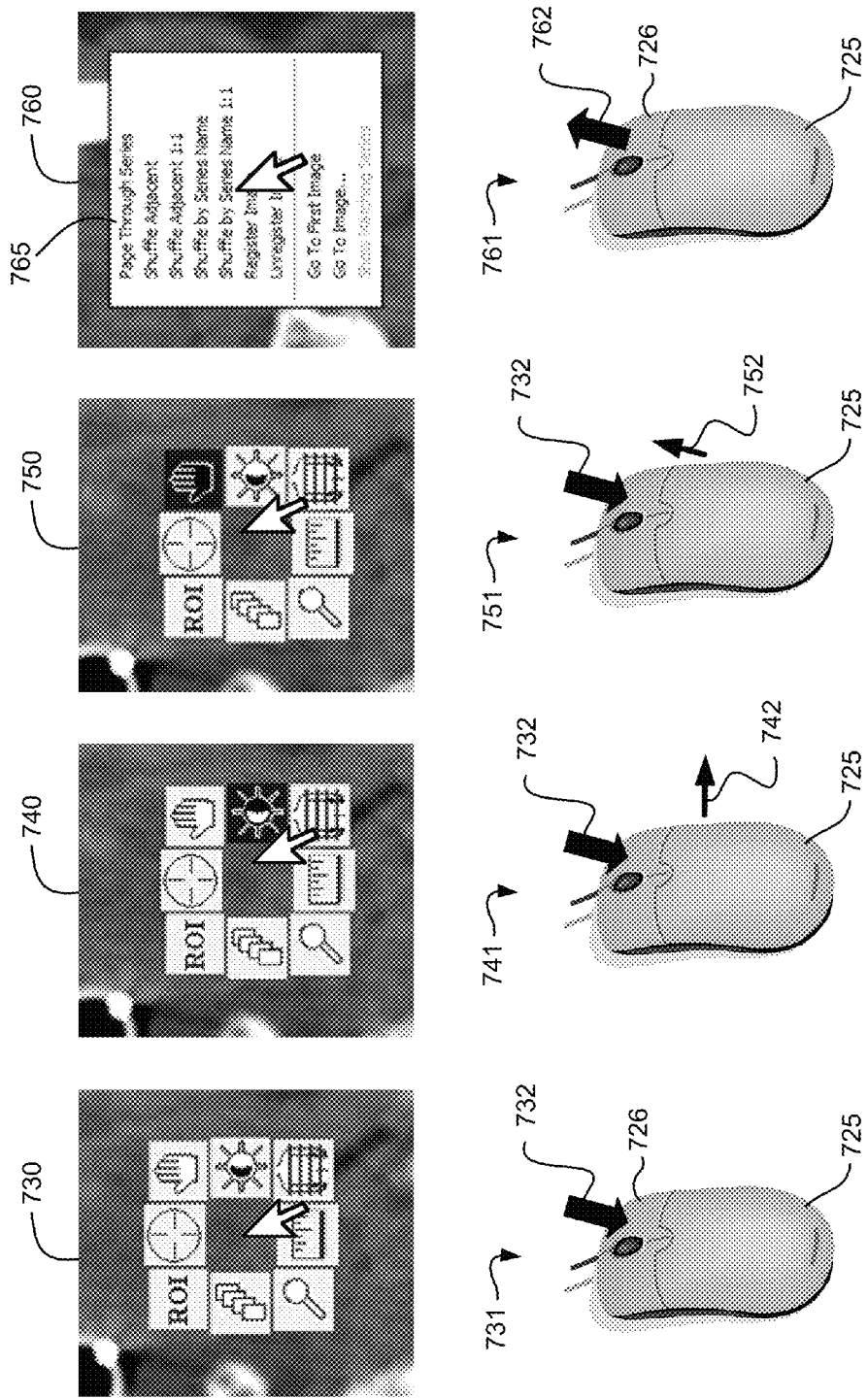
FIG. 7c illustrates sample user interactions with the graphical menu illustrated in FIG. 7b.

FIG. 7c illustrates user interactions with the graphical menu illustrated in FIG. 7a or FIG. 7b. A screen region 730 on which the graphical menu is superimposed is similar to screen regions 708 and 709 in FIG. 7a and FIG. 7b, respectively. For clarity, the various components of screen region 730 are not annotated as they are analogous to those illustrated in FIG. 7a and FIG. 7b. Screen region 730 illustrates a graphical menu having eight unselected icons superimposed on a screen region that in this case is a grayscale image. The cursor is displayed as well, as previously. In this case the cursor is positioned in a region within the graphical menu and no icon within the graphical menu has yet been temporarily selected.

View 731, which is associated with screen region 730, illustrates mouse activity that could have been used to initiate display of the graphical menu within screen region 730. Exemplary mouse 725 includes one or more buttons. In this example, depression of the right mouse button 726 causes display of the graphical menu. Depression of button 726 is illustrated by arrow 732.

View 741 is similar to view 731. While continuing to depress the right mouse button, illustrated by arrow 732, the user moves the mouse to the right, illustrated by motion path 742. This causes rightward motion of the cursor, repositioning it from its position in screen view 730 to that in screen view 740. This causes selection of an icon, as described previously. In comparing the graphical menu in screen view 740 to that in screen view 730, it can be seen that an icon has changed its appearance, indicating to the user that it has been temporarily selected.

View 751 is similar to view 741 but illustrates further mouse movement. In view 751, the user moves mouse 725 superiorly, illustrated by mouse path 752. As in the example illustrated in 740 and 741, this results in repositioning of the cursor and selection of a different icon within the graphical menu.

View 761 illustrates the case where there is little or no cursor repositioning compared to the original position of the cursor in view 730. In this case, net movement of the mouse is insufficient for an icon to be selected within the graphical menu, as discussed previously. In this example, release of mouse button 726, illustrated by arrow 762, results in the display of a different menu from which the user can choose. Thus, the user may be presented with a first graphical menu in response to a first action (e.g., depressing the mouse button) and may be presented with a second menu in response to a second action that follows the first action (e.g., releasing the mouse button without temporarily selecting an icon).

Other Contemplated Embodiments

For some of the embodiments illustrated herein, the user input device is a mouse. However, any input device or combination of input devices could be used to control the graphical menus described herein, including: mouse, trackball, keyboard, touch screen, 3d mice, foot controls, pointing sticks, touchpad, graphics tablet, joystick, brain-computer interfaces, eye-tracking systems, Wii remote, jog dial, and/or steering wheel.

A graphical menu module could be implemented in many situations. For example, a graphical menu module can be implemented within a computer program where the user might use it to choose among options. For example, in a word processing program it might be used to allow the user to choose font options, such as bold, italic, and underline. In a PACS system it might be used to allow users to choose various predefined display settings for an image.

In another example, a graphical menu module can be implemented within a computer program to allow selection of various operations. For example, in a word processing program it could be used to choose among operations like copy, paste, delete, and indent. In a PACS system it could be used to choose among different operations such as window/level, choose series, region of interest, zoom, pan, and others.

In another example, a graphical menu module can be implemented within an operating system where it could be used to choose among operations like "launch web browser," "launch word processing program," "launch spreadsheet program," and so on.

In another example, a graphical menu module can be implemented as an add-in program or standalone driver, such as a mouse driver, that would allow the use of the system in cases where it had not been directly implemented within a program or operating system. The system may be configured to send key strokes or other inputs to the program or operating system for which it was configured.

The appearance and operation of graphical menus used in the system could vary in many ways. For example, the graphical menu, the icons it includes, and how it operates could vary depending on the context in which it was launched. Graphical menus could differ depending on the program or operating system that utilized the system. In addition they could be configurable by the user. In another example, graphical menus could contain one or more icons. In another example, icons within graphical menus could take many forms, including a computer graphic, a picture, and/or text. In another example, icons within a graphical menu could vary in appearance and size. In another example, different methods could be used to allow a user to visually differentiate selected from unselected icons within a graphical menu. For example, the icons could be differentiated by icon appearance, size, color, brightness, features of text font (such as size, bold, italics), and/or motion or blinking (e.g., the selected icon could blink or shake back and forth on the display).

While depression of the right button of a mouse is used in several examples to initiate display of a graphical menu, many other ways are contemplated to initiate display of a graphical menu. For example, such initiation can be via a key on a keyboard, a button on any input device (with example input devices listed herein), a mouse gesture, a gesture on a touch screen with a finger or stylus, physical motion of the device (for example, shaking a handheld device), a result of picking an icon on another graphical menu, and/or a result of a computer or system operation, rather than the result of the user initiating the action. For example, a computer program or operating system might require the user to provide input and in that case display a graphical menu. In another example, a computer with a battery that is running low might display a graphical menu allowing the user to choose among: continue working, shut down, save all open documents, and initiate hibernation.

After an icon is temporarily selected within a graphical menu, several examples herein illustrate the user permanently selecting that icon by releasing the right mouse button. However, they are many ways that a user could permanently select an icon from a graphical menu, including: removing a stylus or finger from a touch screen, pressing a button or key, a mouse gesture, sound input, cursor movement (for example, slight movement from the initial cursor position toward an icon might result in it being temporarily selected; and further movement toward the icon might result in the icon being permanently selected and termination of display of the graphical menu), time (the system could be configured such that a temporarily selected icon would be permanently selected after it was temporarily selected for a predetermined time duration, say for example 100 milliseconds), and/or if the user positioned the cursor over the icon or a predetermined portion of the icon.

Sound

Sound could be used in several ways with this technique to supplement the use of a graphical menu or substitute for the display of a graphical menu. For example, when any icon is temporarily selected, a sound could be played, for example a beep.

In another example, when no icon is temporarily selected (e.g., when the user moves the cursor back toward its initial cursor position after temporarily selecting an icon), a sound could be played. This could be different than the sound played when an icon is selected (e.g., temporary selection of an icon could cause a single beep, and subsequent cursor movement that resulted in no icon selected could result in a double beep).

In another example, different sounds could be played for different icons, even spoken words. This could allow the user to accurately verify selection of an icon without the need for visual verification. For example, a graphical menu within a word processing program might have four choices: "cut", "copy", "paste", and "look up". As the user repositions the cursor, these options could be spoken. If one of these was chosen and the user repositioned to another, the sound associated with the new choice would be spoken. If he repositioned the cursor so that none were chosen, a different phase could be spoken, such as "no selection".

In another example, a system using sound could be constructed in which visual display of the graphical menu was not required. This might be helpful in situations such as: blind users and drivers or pilots where the user would want to choose from a menu of options but not want to direct his attention to a display screen.

SUMMARY

All of the processes described above may be embodied in, and fully automated via, software code modules executed by one or more general purpose or specially configured computers. The code modules may be stored in any type of computer-readable medium or other computer storage device. Some or all of the methods may alternatively be embodied in specialized computer hardware. In addition, the components referred to herein may be implemented in hardware, software, firmware, or a combination thereof.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

One skilled in the relevant art will appreciate that the methods and systems described above may be implemented by one or more computing devices, such as a memory for storing computer executable components for implementing the processes shown, as well as a process unit for executing such components. It will further be appreciated that the data and/or components described above may be stored on a computer readable medium and loaded into a memory of a computer device using a drive mechanism, such as a CD-ROM, DVD-ROM, or network interface, for reading such computer readable medium. Further, the components and/or data can be included in a single device or distributed in any manner.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method for providing a user interface on a computing device, the method comprising:
    displaying a menu on a display of a computing device, the menu having a plurality of icons arranged in an icon region that extends substantially around an initial position of a cursor, the icon region comprising a plurality of selection regions associated with respective icons of the plurality of icons, wherein at least some of the selection regions include an area outside of the respective icons with which the selection regions are associated, and wherein the icon region is positioned asymmetrically with reference to the initial position of the cursor such that the initial position of the cursor is located within a default selection region of the plurality of selection regions and an appearance of a default icon within the default selection region indicates that the default icon is temporarily selected;
    detecting movement of the cursor into a first selection region of the plurality of selection regions, wherein the first selection region includes a first icon of the plurality of icons and a first area outside of the first icon;
    changing appearance of the first icon in response to detecting movement of the cursor to the first selection region, wherein the change in appearance indicates that the first icon is temporarily selected; and
    initiating a first action associated with the first icon in response to detecting an input from the user indicating that the first icon should be permanently selected, wherein at least some of the method is performed by the computing device.

2. The method of claim 1, wherein detecting movement of the cursor into the first selection region comprises detecting movement of the cursor within the first area outside of the first icon within the first selection region without the cursor touching the first icon.

3. The method of claim 1, wherein a second icon of the plurality of icons is smaller than the first icon.

4. The method of claim 1, wherein the icon region is positioned asymmetrically based on a user preferences and/or frequency of use of respective icons.

5. The method of claim 1, further comprising:
    setting a size of the first selection region as larger than a size of a second selection region associated with a second icon based on a determination that the first icon is selected more frequently than the second icon.

6. The method of claim 1, wherein the default selection region is determined based on a user preferences and/or frequency of use of respective icons.

7. The method of claim 1, wherein the input from the user indicating that the first icon should be permanently selected comprises clicking a mouse button with the cursor positioned in the first selection region.

8. The method of claim 1, wherein the input from the user indicating that the first icon should be permanently selected comprises positioning the cursor in the first selection region for a predetermined time period.

9. The method of claim 1, wherein the input from the user indicating that the first icon should be permanently selected comprises positioning the cursor over a predetermined portion of the first icon, the predetermined portion comprising a region of the icon that is less than a complete area of the icon.

10. The method of claim 1, wherein the first action comprises displaying a second menu.

11. The method of claim 10, wherein the second menu comprises a drop-down menu with options associated with the first icon.

12. The method of claim 1, wherein the menu is displayed in response to a battery level of the computing device reaching a threshold level.

13. The method of claim 12, wherein the plurality of icons include icons associated with shut down of the computing device, saving documents open on the computing device, and hibernation of the computing device.

14. The method of claim 1, wherein the computing device is configured to play audible sounds associated with icons in response to determining temporary selection of icons.

15. A computerized method comprising:
displaying, on a mobile computing device including a display and one or more accelerometers, a menu on the display of the mobile computing device, the menu having a plurality of icons arranged in a substantially circular icon region, wherein the menu is displayed in response to shaking the mobile computing device;
detecting, based on input from the one or more accelerometers, tilting or jerking of the mobile computing device in a first direction;
determining an icon of the plurality of icons positioned in the first direction relative to a center of the menu;
changing an appearance of the determined icon to indicate that the determined icon is temporarily selected; and
initiating a permanent selection of the determined icon and a first action associated with the determined icon in response to detecting increased tilting or jerking of the mobile computing device in the first direction.

16. The computerized method of claim 15, wherein the substantially circular icon region is positioned around a cursor position.

17. The computerized method of claim 15, wherein the substantially circular icon region is positioned around a location on the display that is touched by a user of the computing device.

18. The method of claim 1, further comprising:
detecting an oral command from a user of the computing device;
determining a second icon of the plurality of icons associated with the oral command; and
changing appearance of the second icon to indicate that the second icon is temporarily selected.

19. The method of claim 18, further comprising:
providing audible feedback from the computing device indicating the second icon.

* * * * *